United States Patent
Kaspit et al.

(10) Patent No.: US 7,199,920 B2
(45) Date of Patent: Apr. 3, 2007

(54) TWO STAGE OPTICAL AMPLIFIER

(75) Inventors: Idan Kaspit, Rosh Ha'ayin (IL); Iian Halevi, Petach Tikva (IL); David Harris, Jerusalem (IL)

(73) Assignee: ECI Telecom Ltd., Petach Tikva (IL)

( * ) Notice: Subject to any disclaimer, the term of this patent is extended or adjusted under 35 U.S.C. 154(b) by 239 days.

(21) Appl. No.: 10/681,249

(22) Filed: Oct. 9, 2003

(65) Prior Publication Data
US 2004/0076437 A1 Apr. 22, 2004

(30) Foreign Application Priority Data
Oct. 9, 2002 (IL) .................................... 152193

(51) Int. Cl.
*H04S 5/00* (2006.01)
*H04B 10/12* (2006.01)

(52) U.S. Cl. ........................ 359/337.4; 398/2
(58) Field of Classification Search ............. 359/337.4; 398/2
See application file for complete search history.

(56) References Cited

U.S. PATENT DOCUMENTS

| | | | |
|---|---|---|---|
| 5,557,265 A * | 9/1996 | Moothart et al. ........... 340/635 |
| 5,778,132 A * | 7/1998 | Csipkes et al. ............. 385/135 |
| 5,978,131 A | 11/1999 | Lauzon et al. | |
| 6,215,584 B1 * | 4/2001 | Yang et al. ................. 398/160 |
| 6,344,915 B1 * | 2/2002 | Alexander et al. .......... 398/115 |
| 6,411,430 B1 | 6/2002 | Ogino et al. | |
| 6,433,925 B1 * | 8/2002 | Sakano et al. ......... 359/341.43 |
| 6,437,888 B1 | 8/2002 | Grasso et al. | |
| 6,611,371 B2 * | 8/2003 | Wigley et al. ........... 359/337.2 |
| 6,690,503 B2 * | 2/2004 | Yamanaka .................. 359/334 |
| 2003/0117696 A1 | 6/2003 | Goobar et al. | |
| 2003/0151789 A1 * | 8/2003 | Hamoir ...................... 359/239 |
| 2004/0223210 A1 * | 11/2004 | Kaspit et al. ............. 359/341.2 |

OTHER PUBLICATIONS

Merriam-Webster's Collegiate Dictionary, 10th ed., 1999, Meriam Webste, p. 54.*

* cited by examiner

Primary Examiner—Jack Keith
Assistant Examiner—Eric Bolda
(74) Attorney, Agent, or Firm—The Nath Law Group PLLC; Harold L. Novick

(57) ABSTRACT

The invention describes a two-stage optical amplifier adapted for inserting OADM in the mid-stage, and an integrated assembly designed for implementing the amplifier in a way suitable for forming unidirectional and bi-directional configurations useful in optical networks. One of them is a so-called east-west configuration for a bi-directional transmission, where each direction of the optical transmission is served by the two-stage optical amplifier the $1^{st}$ stage of which belongs to one integrated assembly, and the $2^{nd}$ stage—to another assembly.

7 Claims, 4 Drawing Sheets

TWO STAGE OPTICAL AMPLIFIER

FIELD OF THE INVENTION

The present invention concerns a configuration of a so-called two stage optical amplifier which is a widely known element in optical telecommunication networks.

BACKGROUND OF THE INVENTION

Traditionally, a two-stage optical amplifier serves as a piece of equipment of an optical line.

Usually, the two stages of amplification are two different amplifying units connected in sequence in a pre-manufactured assembly, where the first unit is considered the first stage of the assembly and called an optical pre-amplifier, while the second unit (an optical booster) which follows the first one is considered the second stage. Such a configuration is usually implemented as a unidirectional integral assembly and, in the frame of the present description, will be called a conventional two-stage unidirectional configuration.

Each of the amplifying units usually comprises a single stage optical amplifier such as EDFA (Erbium Doped Fiber Amplifier) characterized by particular optical features (gain, flatness, noise, output power, etc).

The conventional two-stage unidirectional configuration is advantageous in that it has a higher maximum output power than a single stage optical amplifier and allows using relatively inexpensive amplifying units which might have differing optical parameters. However, when connecting such amplifiers into the two-stage configuration, degradation may appear in the flatness of the gain over the band of optical wavelengths supported by the combined amplifier. For this reason, the two amplifiers for the two-stage configuration are usually selected to have gain characteristics which allow them to compensate for one another. The gain flatness can be adjusted by an operator during the manufacturing process, when connecting the two stages. In practice, when manufacturing the assembly, the optical parameters of the first stage and the second stage of the unidirectional configuration are matched to produce the best performance, using a control interconnection between the two stages. That control interconnection comprises a communication channel and a micro controller, both provided within the assembly and serving the two mentioned stages of the unidirectional assembly. During operation of the assembly, the control interconnection continues to fulfill its functions for matching parameters of the amplifiers and to coordinate their operation.

The unidirectional configuration may include a network element connected between the two stages (in the mid-stage); such intermediate elements provide signal attenuation, dispersion compensation, or other features.

One example of such a configuration is described in U.S. Pat. No. 6,215,584.

It should be mentioned that the conventional two-stage or multi stage unidirectional assembly, even when allowing independent control of parameters of the stages by the control circuit, is arranged in such a way that if a fiber cut occurs before the first stage amplifier, it behaves as a single integral device. That is, all stages of the assembly are shut down by the assembly controller, since the whole assembly appears to be useless in the absence of the input optical signal. Such a shutdown would adversely affect the use of an OADM (Optical Add Drop Multiplexer) in the mid-stage of the above-described configuration. One should recall that an OADM is intended for receiving a WDM (wavelength division multiplexed) multi-channel optical signal, dropping at least part of the optical information channels in the signal, and/or adding information to at least one of vacant optical channels in the signal for further transmitting a newly composed multi-channel multiplexed optical signal. Therefore, an OADM in the mid-stage can be rendered useless, since the complete shutdown of the two-stage configuration in the case of a fiber cut is harmful not only to the information received at the $1^{st}$ stage, but also to the information added by the OADM.

The unidirectional two-stage configuration could theoretically be built from two separate amplifiers, which do not form an integrated assembly and thus each of the stages works independently when the other stage fails for any reason. Such a configuration would easily allow inserting OADM or any other element in the mid stage. However, in that case, high quality amplifiers with flat optical characteristics would be required and the configuration would become too expensive.

OBJECT OF THE INVENTION

It is the object of the present invention to provide a two-stage optical amplifier configuration which would be suitable for inserting, between the two stages thereof, any network element (including optical add drop multiplexer OADM) and being free from disadvantages of the known two-stage configurations of optical amplifiers.

SUMMARY OF THE INVENTION

According to the first aspect of the invention, the Inventors propose a two-stage configuration of an optical amplifier (comprising $1^{st}$ stage, a $2^{nd}$ stage and a mid-stage) wherein each stage of the configuration is formed by at least one optical amplifying unit, and wherein the configuration (i.e., the optical amplifier):

being adapted for inserting in the mid-stage thereof any network element (possibly comprising OADM), allowing matching at least one optical characteristics of the two stages, and being capable of leaving one of the stages to function in a regular regime whenever the other of the stages is shut down.

It should be noted that each stage of the two-stage amplifier may be composed of one or more amplifying units. In the simplest case, each stage comprises one optical amplifier.

The above-defined amplifier configuration, while allowing independent functioning of the two stages, can be built from inexpensive amplifying units matched from the point of optical characteristics.

To obtain said at least one matched optical characteristics, it is proposed that the two stages of the two-stage amplifying configuration be interconnected with one another by a control-communication channel for, at least, gain control of said amplifying units. Preferably, the channel provides also for control of other optical parameters of the amplifying units (and thus of the resulting optical amplifier), such as gain flatness and gain tilt.

Selection of the parameters to be matched and the preliminary matching of the first stage and the second stage of the amplifier are to be performed by the manufacturer. Further, the control-communication channel serves for adjusting the parameters during operation of the assembly.

According to one embodiment of the amplifier configuration, it can be implemented on the conventional unidirectional two-stage amplifying assembly, by providing to it said ability to prevent shutting down the other one of the stages when one of the stages is to be shut down (say, when a fiber cut is detected). A system comprising a pair of such assemblies may serve two opposite directions of optical transmission, where each assembly is used for a particular direction.

The term "assembly" should be understood as a prefabricated module, most likely an integrated printed circuit card.

To enable operability of the other stage when one of the stages in the integral unidirectional two-stage amplifying assembly is to be shut down, changes should be introduced in the control-communication channel of the assembly (for example, in its micro-controller). The control-communication channel (or control interconnection), which exists in the conventional integral two-stage unidirectional assembly and comprises a communication channel and a micro controller, will enable matching the parameters of the two stages also in the presence of such element as OADM in the mid-stage.

According to one preferred embodiment of the invention, the two-stage configuration (amplifier) comprises its $1^{st}$ stage and its $2^{nd}$ stage located at two separate assemblies (modules or cards), wherein the optical connection and the control-communication channel between the stages is arranged externally between said cards.

In accordance with the most preferred embodiment of the invention, there is provided a combined configuration (which will further be referred to as East-West bi-directional configuration or system) comprising a pair of two-stage amplifiers as defined above, for respectively serving two opposite directions of optical transmission; in the combined system each of the separate assemblies (modules) accommodates the $1^{st}$ stage of one said two-stage amplifier and the $2^{nd}$ stage of the other said two-stage amplifier.

Any of the above-mentioned configurations (i.e., any of the defined amplifiers or systems) can be implemented using the following newly proposed universal assembly that forms a second aspect of the present invention:

A universal two-stage optical amplifier assembly (universal assembly) comprising a $1^{st}$ stage and a $2^{nd}$ stage, each formed by at least one optical amplifying unit, said $1^{st}$ and $2^{nd}$ stages being preliminarily matched from the point of at least one optical characteristics to be suitable to form a two stage optical amplifier, input of the assembly being connected to input of the $1^{st}$ stage, output of the $2^{nd}$ stage being connected to output of the assembly, output of the $1^{st}$ stage and input of the $2^{nd}$ stage are respectively connected to a pair of mid-stage contacts of the assembly (thereby allowing introducing an optical element either between the $1^{st}$ stage and the $2^{nd}$ stage of the universal assembly, or between any of the stages of said universal assembly and a complementary stage of another similar universal assembly, the assembly also comprises a control-communication circuit capable of matching at least one optical characteristics of the assembly and of preventing shut down of one stage when the other is shut down, wherein said circuit being selectively configurable either to form a control-communication channel between the $1^{st}$ stage and the $2^{nd}$ stage of said assembly, or to disconnect said channel there-between while enabling each of the $1^{st}$ stage and the $2^{nd}$ stage to form a separate control-communication channel with a complementary stage located on another similar universal assembly.

The universal assembly is formed on one module, preferably being an integrated printed circuit card.

Preferably, the $1^{st}$ stage and the $2^{nd}$ stage are preliminarily matched in such a manner that the $1^{st}$ stage of the universal assembly is preliminarily adjusted to match to a set of average characteristics designed for the $2^{nd}$ stage, while the $2^{nd}$ stage of the universal assembly is preliminarily adjusted to match to a set of average characteristics designed for the $1^{st}$ stage, so that any of the $1^{st}$ stage and the $2^{nd}$ stage of said universal assembly approximately matches to a complementary stage of said universal assembly or of another similar universal assembly.

Also preferably, the control-communication circuit is capable of further dynamically matching any of the $1^{st}$ stage and the $2^{nd}$ stage of said universal assembly to a complementary stage of said universal assembly or of another similar universal assembly.

In the preferred embodiment, the control-communication circuit comprises a switch or just a pair of contacts, dividing the circuit into two separate portions respectively suitable for being connected to corresponding separate portions of a control-communication circuit of another similar universal assembly, so to form a control-communication channel between a $1^{st}$ stage of one assembly and a $2^{nd}$ stage of the other assembly and wise versa.

The above-defined universal two stage assembly (universal assembly) can be used for forming:

a) a unidirectional two-stage configuration (a two-stage optical amplifier) based on one universal integrated assembly, when the mid-stage contacts serve for connecting the stages of the same assembly and the control-communication channel is also formed there-between (shown as assembly 20 or 120 in FIG. 3a);

b) a bi-directional configuration or system for serving two directions of optical transmission (shown in FIG. 3b) where each of the two directions of optical transmission is served by (a), i.e. by the unidirectional two-stage amplifier configuration built using one universal integrated assembly;

c) a unidirectional two-stage configuration (a two-stage optical amplifier) based on two universal assemblies, where $1^{st}$ stage of one assembly is directly or indirectly connected to $2^{nd}$ stage of the other assembly, and the control-communication channel is formed between these same stages of the different assemblies (shown as a contour 51 in FIG. 3c or as a contour 60 in FIG. 3d);

d) a bi-directional combined configuration or system (FIGS. 3c, 3d) based on two universal assemblies, where each direction of optical transmission is served by the amplifier configuration (c). This bi-directional system is a so-called East-West configuration.

Owing to the fact that the stages of the two-stage amplifiers are located at different modules (assemblies, cards), and due to the fact that the control-communication channel is arranged between the two modules to enable matching of the optical parameter(s) of the stages belonging to different modules, the configurations (c) and (d) ensure:

easy replacement of any of the stages if needed, without a harm to the second stage and, upon replacing the module with another universal assembly, operation without degradation of the two-stage configuration performance since the matching will be performed by the newly formed control-communication channel.

All the above-proposed two-stage optical amplifying configurations (amplifiers and systems) are suitable for inserting OADM in the mid-stage.

To understand inventiveness of the proposed two-stage optical amplifying configurations and the universal assembly over the prior art, one should recall that:

firstly, a conventional two-stage unidirectional configuration has a set of improved optical characteristics but, when a fiber cut is detected before its first stage amplifier, behaves as an integral device shutting down both its stages;

secondly, an OADM, if inserted in the mid-stage of the conventional configuration, would be disabled since the complete shutdown of the two-stage configuration in a case of a fiber cut is harmful to the information added by the OADM; it should be noted that the information introduced by the OADM comes from source(s) non-affected by the fiber cut, and could be independently transmitted to the network if not for the complete shut down of the assembly;

thirdly, a two-stage amplifier, if assembled from optical amplifiers being not of the highest quality, needs prior matching there-between and never enables replacement of any of the amplifiers (be it possible) without degradation of the configuration performance, since re-matching the new pair of amplifiers is very problematic.

The proposed configurations and the universal assembly allow overcoming the above-mentioned disadvantages.

According to a slightly different aspect of the invention, there is also provided a system comprising any of the described two-stage optical amplifier configurations, with an OADM in the mid-stage.

Further details and explanations will be given as the description proceeds.

BRIEF DESCRIPTION OF THE DRAWINGS

The invention will be further described and illustrated with the aid of the following non-limiting drawings in which.

DETAILED DESCRIPTION OF THE INVENTION

Figure 1A:
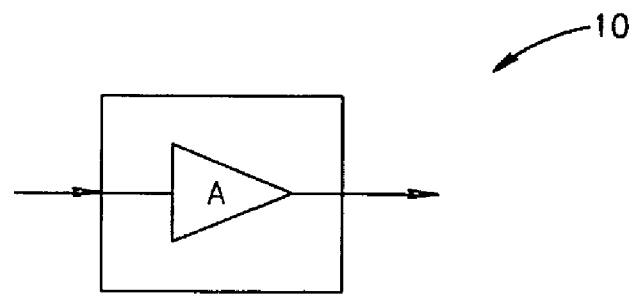
FIG. 1a shows a conventional one stage optical amplifier.

FIG. 1a (prior art) schematically illustrates a basic optical amplifier 10. Arrows at the input and the output of the amplifier show direction of the optical transmission. Any optical amplifier is characterized by a number of optical parameters, which include, for example, the following set: gain, flatness of the amplifier's gain (as a function of wavelength), noise figure, maximal output power of the amplifier. A stand-alone amplifier of a high quality usually has good optical characteristics (say, the uniform flatness over a sufficiently wide spectrum of wavelengths), and is relatively expensive.

An amplifying unit of a moderate quality is quite cheap but is not used alone since it has non-uniform optical characteristics.

Figure 1B:
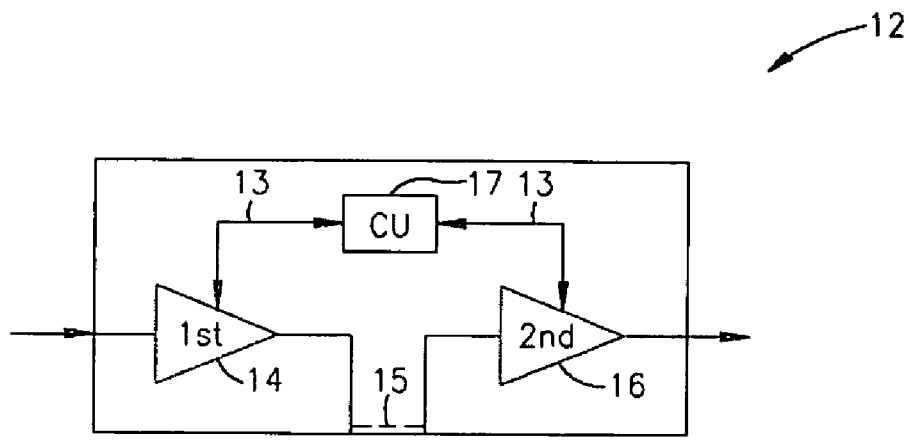
FIG. 1b shows a conventional two-stage unidirectional optical amplifier assembly.

FIG. 1b (prior art) schematically illustrates a conventional two-stage optical amplifier assembly 12 where the output of a $1^{st}$ stage amplifying unit 14 is connected to the input of a $2^{nd}$ stage optical amplifying unit 16 either directly (a dotted line 15) or via an optical element (not shown) which can be connected in the mid-stage.

Owing to the fact that the $1^{st}$ stage and the $2^{nd}$ stage amplifiers produce a summary gain and are preliminarily matched in the pre-fabricated assembly, the set of parameters which is provided by the assembly 12 is improved in comparison with that of a single amplifying unit.

The parameters are matched also dynamically, during operation of the assembly, by providing there-between a control-communication channel schematically shown as 13 with a micro controller 17 to ensure the power and gain control. The conventional configuration 12 shuts down completely in case any of the stages 14 or 16 fail or has to be shut down.

According to one embodiment of the present invention, the conventional configuration 12 can be modified into such preventing the complete shut down when one of the stages is shut down. For example, the micro controller 17 can be reprogrammed to prevent shutting down the $2^{nd}$ stage 16 in case of a fiber cut before the $1^{st}$ stage 14, while still shutting down the $1^{st}$ stage 14.

Figure 2:
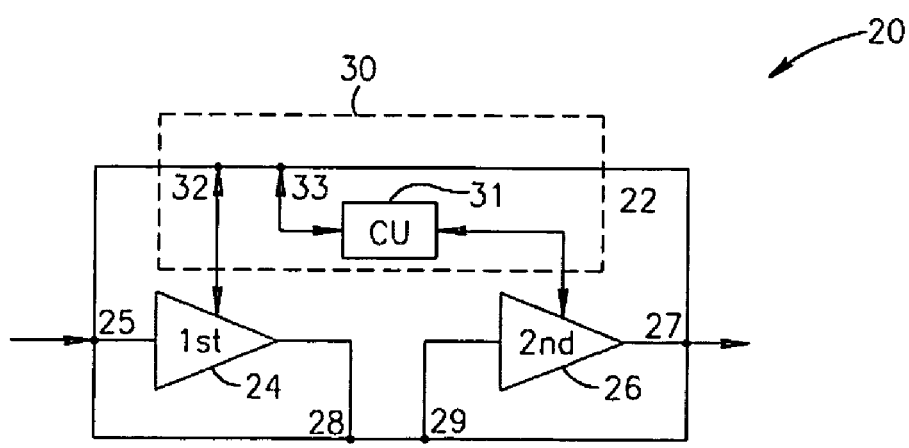
FIG. 2 schematically illustrates the proposed universal two stage optical amplifier assembly suitable for inserting a network element in the mid-stage.

FIG. 2 schematically illustrates the proposed universal two-stage amplifier assembly 20 which, in the simplest case, comprises two amplifier units placed on one card 22. An amplifying unit 24 of the $1^{st}$ stage is preliminarily adjusted to match to a pre-selected set of averaged optical characteristics which is designed for $2^{nd}$ stage amplifying units of any of such universal assemblies, while the unit 26 of the $2^{nd}$ stage is preliminarily adapted to match to a pre-selected set of averaged optical characteristics designed for $1^{st}$ stage amplifier units of the universal assembly. Therefore, the $1^{st}$ and the $2^{nd}$ stages of the assembly 20 are in advance matched to provide a set of optical characteristics which should be better that those of one of the stages. Input 25 of the assembly is connected to input of the $1^{st}$ stage, output of the $2^{nd}$ stage is connected to the output 27 of the assembly, and the mid-stage of the configuration is connected to so-called mid-stage contacts 28, 29 of the assembly. It is understood that these contacts may be connected to network element(s) to be placed in the mid-stage, if so desired, or short-circuited. The assembly 20 comprises a control-communication circuit schematically marked by a dotted contour 30. The circuit 30 comprises a micro-controller 31 (which, inter alia, is adapted to prevent shutting down both stages of a two-stage configuration if one of the stages fails) and forms a broken control-communication channel between the $1^{st}$ stage and the $2^{nd}$ stage, say by providing two external contacts 32 and 33. When short-circuited, the contacts form the closed control-communication channel between the amplifiers 24 and 26.

Optionally, the contacts 28, 29 and 32, 33 may be replaced by switches (not shown) for providing any desired connections.

Figure 3A:
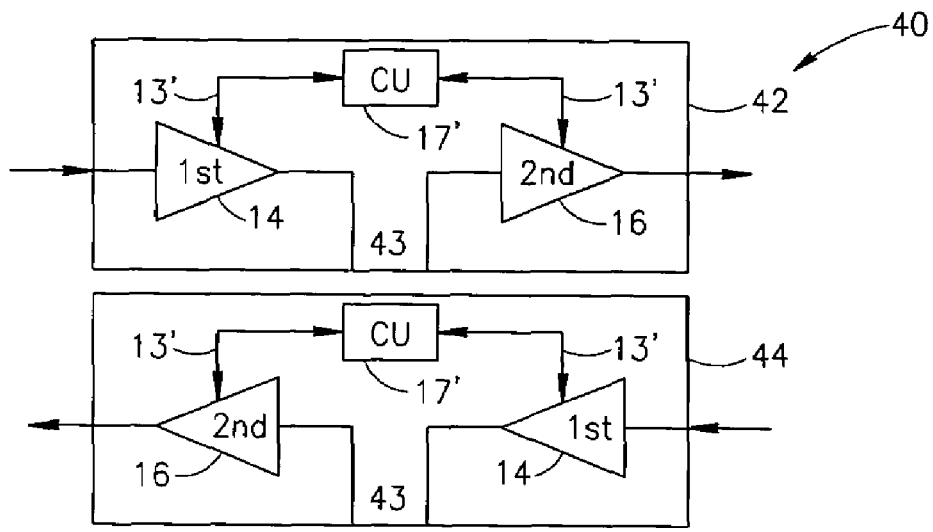
FIG. 3a is a schematic block-diagram illustrating a bi-directional two-stage amplifier configuration where each direction of the transmission is served by one two-stage amplifier assembly.

FIG. 3a illustrates one bi-directional configuration 40 using two unidirectional integrated assemblies 42 and 44 respectively serving two opposite directions of transmission in a telecommunication line. Each of the assemblies 42 and 44 suits for inserting any network element (and OADM as well) in the mid stage 43 thereof. Each of the assemblies 42 and 44 can be a unidirectional assembly similar to that shown in FIG. 1b but modified (channel 13' and CU 17') so as to prevent complete shutting down of the assembly when one of its stages is shut down.

Figure 3B:
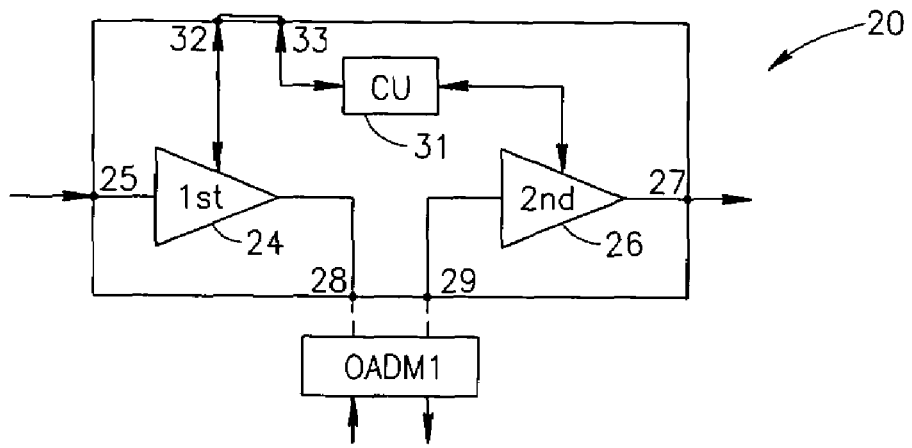
FIG. 3b illustrates how the configuration shown in FIG. 3a can be built using the universal assemblies as shown in FIG. 2.
Figure 3B:
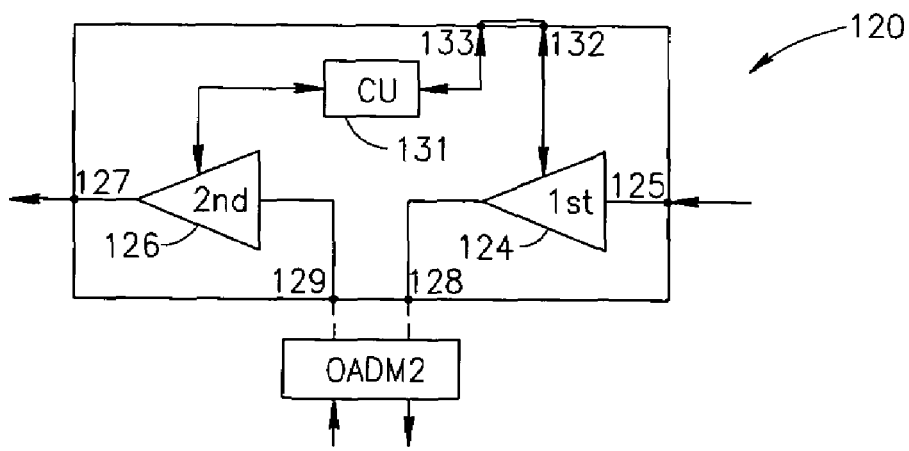

FIG. 3b shows how the configuration 40 can be built from a pair of the identical universal assemblies 20 and 120, as illustrated in FIG. 2. For the sake of example, each of the assemblies serving a particular direction is shown with an OADM in the mid-stage. All reference numbers of the assembly 120 are formed by adding digit 1 before the analogous numerals of the assembly 20.

Figure 3C:
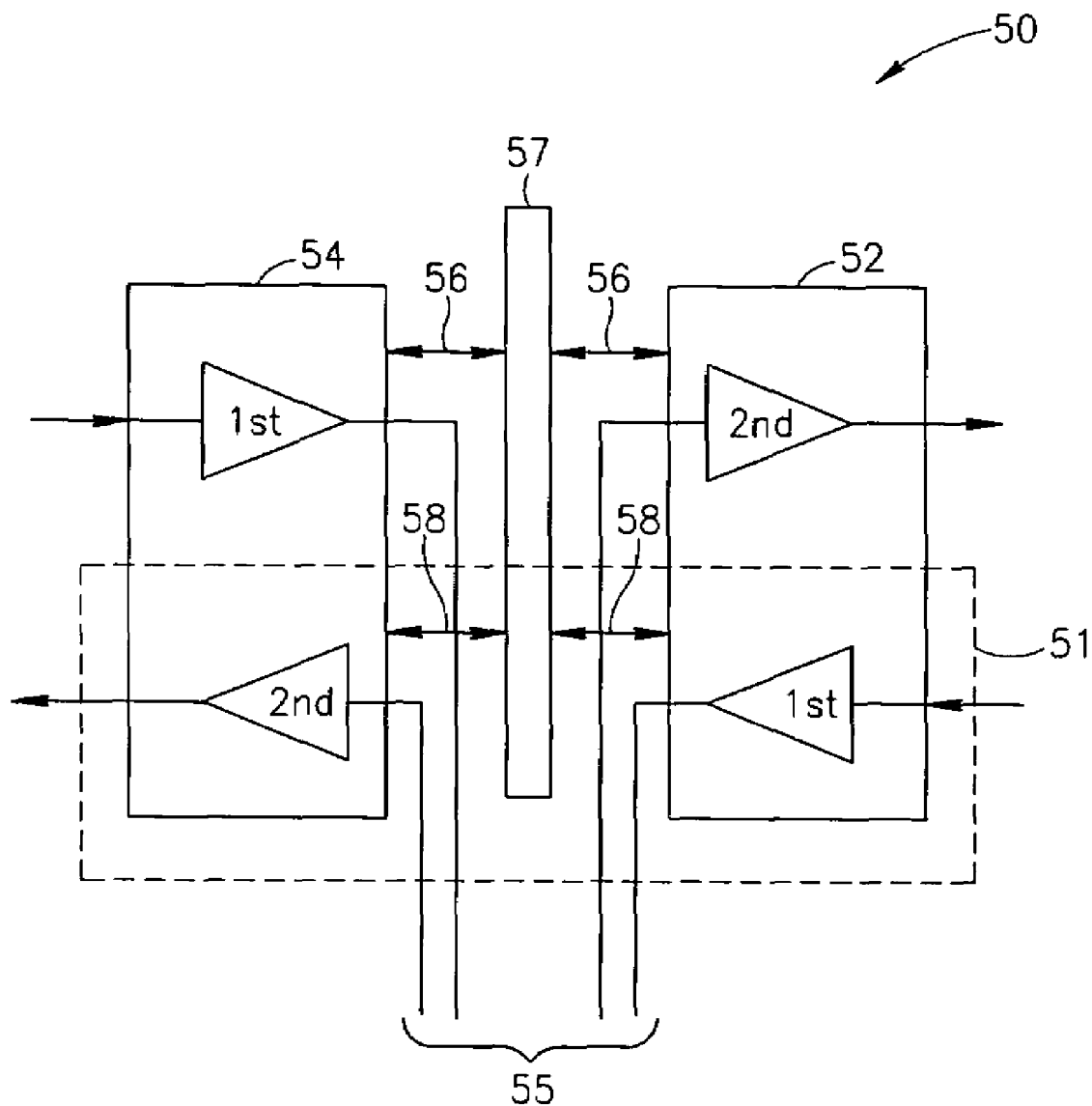
FIG. 3c illustrates a schematic block-diagram of a bi-directional two-stage amplifier configuration where each direction of transmission is served by two two-stage amplifier assemblies (East-West configuration).

FIG. 3c illustrates a schematic block-diagram of a bi-directional two-stage amplifiers' configuration 50 where each direction of transmission is served by a two-stage amplifier configuration (such as 51) formed by two different integrated amplifier assemblies (cards) 52 and 54. This bi-directional configuration 50 is the most preferred one, a so-called East-West configuration, which cannot be implemented using neither the conventional two-stage integrated assembly (FIG. 1b), nor its modified version.

A so-called mid-stage 55 of both of the unidirectional configurations utilizes the real gap between inputs and outputs of the two cards 52 and 54, and may serve for inserting optical elements between the stages of the unidirectional configurations. The control-communication channels schematically shown and marked 56 and 58 are also arranged between the cards. All or some external connections can be arranged, for example, using a back-plane 57 of a shelf structure holding the cards 52, 54, fixed couplings may be formed in the back plane for the purpose.

Figure 3D:
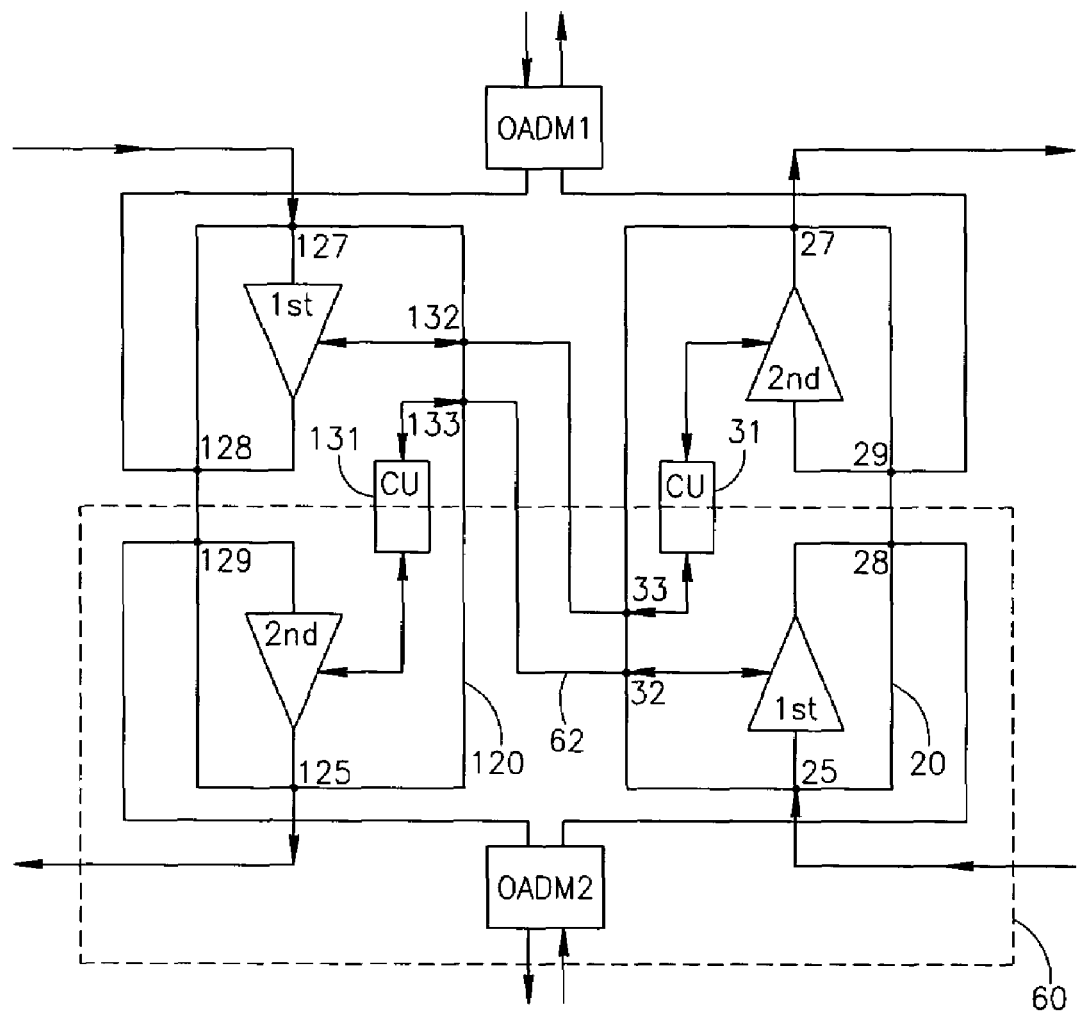
FIG. 3d shows how the East/West configuration of FIG. 3c can be implemented using a pair of the universal assemblies shown in FIG. 2.

FIG. 3d illustrates how the configuration 50 can be realized using the proposed universal integrated assembly of FIG. 2. Two assemblies 20 and 120 are shown, and their connections demonstrate how the mid-stages are formed and how new control-communication channels between the newly formed two-stage configurations are formed using portions of the control-communication circuits of the two separate assemblies 20, 120. One of the two newly formed unidirectional configurations is shown by a dotted contour 60, its newly formed control-communication channel is marked 62. The similar configuration, with its control-communication channel, is built for the opposite direction of the optical transmission.

Though the invention has been described with the aid of schematic exemplary embodiments, it should be appreciated that other modifications and more elaborated versions of the described configurations, assembly and system might be proposed, which are to be considered part of the invention.

The invention claimed is:

1. A two-stage optical amplifier comprising
at least one input and at least one output,
a first stage comprising at least one optical amplifying unit and at least one input and at least one output,
a second stage comprising at least one optical amplifying unit and at least one input and at least one output,
contacts disposed at a mid-stage between said first and second stages connectable to an OADM, and
a local control-communication circuit comprising a control-communication channel between said first and second stages that controls said first and second stages so as to allow dynamic matching of at least one optical characteristic of one of said first and second stages to respective at least one characteristic of the other of said first and second stages, and to prevent automatic shutting down of one of said first and second stages whenever the other of said first and second stages is shut down, wherein the at least one input of the two-stage optical amplifier is connected to the at least one input of the first stage,
the at least one output of the two-stage optical amplifier is connected to the at least one output of the second stage,
the at least one output of the first stage and the at least one input of the second stage are respectively connected to the contacts disposed at a mid-stage of the two-stage optical amplifier, thereby allowing the introduction of an optical element either between the first stage and the second stage of the two-stage optical amplifier, or between any of the stages of said two-stage optical amplifier and a complementary stage of another similar two-stage optical amplifier, and
the control-communication circuit is arranged so as to be selectively configurable either to form the control-communication channel between the first stage and the second stage of said two-stage optical amplifier, or to disconnect said first stage from said second stage while enabling each of the first stage and the second stage to form a separate control-communication circuit and control-communication channel with a complementary stage located on another similar two-stage optical amplifier.

2. The two-stage optical amplifier according to claim 1, wherein:
said two the first and second stages are preliminarily matched to one another on at least one optical characteristic so that
the first stage of the amplifier is preliminarily adjusted to match to a set of characteristics of the second stage,
the second stage of the amplifier is preliminarily adjusted to match to a set of characteristics of the first stage,
the first stage of the amplifier approximately matches a complementary stage of said amplifier or of another similar amplifier, and
the second stage of the amplifier approximately matches a complementary stage of said amplifier or of another similar amplifier; and said control-communication channel interconnects the two stages with one another for controlling at least one parameter of either the first or second stage selected from the group consisting of: gain, gain flatness, and gain tilt.

3. The two-stage optical amplifier according to claim 1, wherein:
the first stage and the second stage are preliminarily matched so that the first stage of the two-stage optical amplifier is preliminarily adjusted to match to a set of characteristics designed for the second stage, and
the second stage of the two-stage optical amplifier is preliminarily adjusted to match to a set of characteristics designed for the first stage,
thereby any of the first stage and the second stage of said two-stage optical amplifier approximately matches to a complementary stage of said two-stage optical amplifier or of another similar two-stage optical amplifier.

4. The two-stage optical amplifier according to claim 1, wherein:
the control-communication circuit is divided into two separate portions, and
each of said two separate portions is respectively suitable for being connected to corresponding separate portions of a control-communication circuit of another two-stage optical amplifier, so as to form a control-communication channel between the first stage of the two-stage optical amplifier and a second stage of the other two-stage optical amplifier, and a control-communication channel between the second stage of the two-stage optical amplifier and a first stage of the other two-stage optical amplifier.

5. The two-stage optical amplifier according to claim 1, wherein:
   the contacts form a direct or indirect connection between the stages of the two-stage optical amplifier, and
   the control-communication channel is formed between the stages of the two-stage optical amplifier.

6. A system comprising at least one two stage optical amplifier according to claim 1, further including an OADM connected in the mid stage.

7. The two-stage optical amplifier according to claim 1, wherein:
   the amplifier is located on one module, and
   the control-communication circuit is provided with a micro controller having an ability to prevent shutting down one of the first or second stages when the other of the first or second stages is to be shut down due to a failure detected at its side.

* * * * *